Nov. 3, 1964            G. G. CROSS           3,155,599
REMOVAL OF SATURATED CARBONYL COMPOUNDS FROM UNSATURATED NITRILES
Filed Aug. 22, 1962
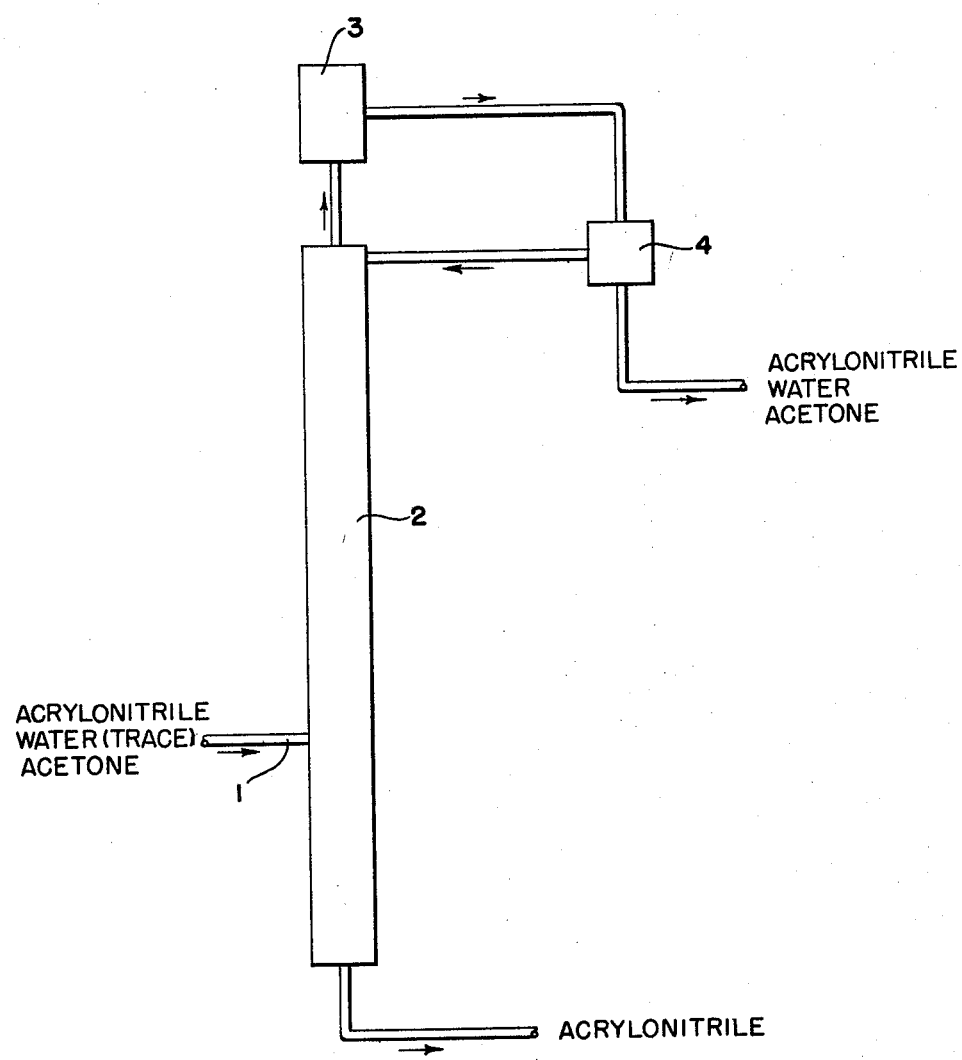
INVENTOR.
GORDON G. CROSS
BY
ATTORNEY 3,155,599
REMOVAL OF SATURATED CARBONYL COMPOUNDS FROM UNSATURATED NITRILES
Gordon G. Cross, Chagrin Falls, Ohio, assignor to The Standard Oil Company, Cleveland, Ohio, a corporation of Ohio
Filed Aug. 22, 1962, Ser. No. 218,513
4 Claims. (Cl. 202—42)

This invention relates to the purification of olefinically unsaturated nitriles, such as acrylonitrile, to separate them from small amounts of saturated carbonyl compounds, such as acetone.

When an olefin, propylene or isobutylene, for instance, is reacted with ammonia and oxygen to produce the corresponding unsaturated nitrile, such as acrylonitrile or methacrylonitrile, there is also produced trace amounts of carbonyl compounds of relatively low molecular weight, including acetaldehyde, propionaldehyde, acrolein, methacrolein, acetone, methyl ethyl ketone, etc.

The separation of the unsaturated carbonyl compounds, when they are present in trace amounts, presents no problem since these are homo-polymerizable under the normal distillation conditions and do not require any treatment, treating step, or treating agent in order that they may be separated from the unsaturated nitrile. The acrolein, for example, without treatment, readily dimerizes to the water-soluble dimer and does not go over head when acrylonitrile is distilled, but remains in the waste water from the absorber.

The saturated carbonyl compounds, however, present troublesome purification problems, because they do not polymerize and trace amounts of these present in an unsaturated nitrile-water mixture are extremely difficult to remove by distillation procedures.

A discussion of the problems involved in separating mixtures comprising acrylonitrile, acetone and water, as well as a means for accomplishing the separation by distilling in the presence of gross amounts of added water, is given in U.S. Patent No. 2,681,306.

In accordance with the present invention, the unsaturated nitrile can be recovered substantially free from saturated carbonyl compounds, i.e., less than a total of 300 parts per million and preferably less than 100 parts per million based on the weight of unsaturated nitrile.

In accordance with this invention, it has been discovered that a saturated carbonyl compound impurity can be removed from a mixture of unsaturated nitrile, water and saturated carbonyl compound by drying said mixture at least to the extent that the weight of water present in said mixture is less than the weight of the saturated carbonyl compound and then removing the saturated carbonyl compound as overhead in an efficient distillation operation. The use of small amounts of polymerization inhibitors which are known in the art in the distillation step in order to prevent or minimize polymerization of the olefinically unsaturated nitrile is within the scope of the present invention.

The accompanying drawing illustrates one method of carrying out the process of the present invention. The drawing depicts a distillation apparatus in which the feed stream of acrylonitrile, water and acetone 1 containing a lesser weight of water than acetone is introduced less than half way up the length of an efficient fractional distillation column 2 equipped at the top with a vapor condenser 3 and a condensate splitter 4 from which most of the condensate is returned to the column and from which a small proportion of the single phase condensate containing acrylonitrile, water and acetone is withdrawn and discarded. The purified acrylonitrile is drawn off from the bottom of the fractional distillation column.

In a more specific illustration of the present invention a mixture of acrylonitrile, water and acetone resulting from the reaction of propylene, ammonia and oxygen is first subjected to an azeotropic distillation wherein the acrylonitrile-water azeotrope is removed until the water content of the bottoms is less than the acetone content on a weight basis and then the acetone is substantially removed overhead from the bottoms in an efficient distillation apparatus at a reflux ratio of from about 400:1 to 1000:1 leaving a bottoms acrylonitrile which is substantially anhydrous and free of acetone. The removal of water from the acrylonitrile, water and acetone mixture described above may be done by other procedures than that of azeotropic distillation. The use of chemical or physical drying agents and other conventional procedures for removing water from organic compounds may be used in the first step of the present process without departing from the scope of the present invention.

In the following example, which will serve primarily to illustrate the process of this invention, the amounts of ingredients are expressed as parts by weight unless otherwise indicated.

*Example*

A. A continuous distillation was carried out in a 45 actual plate fractionation column. The feed entered at the 15th tray from the bottom. A six hour run was made and the ratio of the moles of downflowing liquid to upflowing vapor in the stripping section was 1.5. The feed was primarily acrylonitrile containing 0.1% by weight of acetone and 0.03% by weight of water. The feed was prepared by subjecting the feed given under B below to azeotropic distillation in a conventional efficient column having an overhead condenser and liquid phase separator from which the condensed water phase was continuously removed and the condensed organic phase was continuously returned to the column. The acetone was removed as overhead at a reflux ratio of 940 to 1. The overhead composition was found to be 48% by weight of acetone. The purified acrylonitrile left as a bottoms product contained 0.01% by weight (100 p.p.m.) of acetone.

B. Procedure A was repeated except that the feed contained 0.33% by weight of water and 0.1% by weight of acetone. The overhead composition was found to be only 20% by weight of acetone. The acrylonitrile in the bottom of the column contained 0.05% by weight (500 p.p.m.) of acetone which is excessive and fails to meet most commercial specifications for acrylonitrile monomer.

I claim:
1. The process for purification of a mixture of an olefinically unsaturated nitrile selected from the group consisting of acrylonitrile and methacrylonitrile containing water and small amounts of a saturated carbonyl compound comprising removing water from the mixture of nitrile, water and saturated carbonyl compound at least to the extent that the resultant mixture contains fewer parts by weight of water than of saturaed carbonyl compound and then fractionally distilling the resultant mixture in a distillation zone to recover as overhead substantially the remainder of the water and saturated carbonyl compound and recovering the substantially pure olefinically unsaturated nitrile as bottoms.
2. The process of claim 1 wherein the olefinically unsaturated nitrile is acrylonitrile.
3. The process of claim 2 wherein the saturated carbonyl compound is acetone.
4. The process for purification of acrylonitrile containing more than about 300 parts per million of acetone and water wherein the weight ratio of acetone to water is less than one, comprising removing water by azeo- tropic distillation and liquid phase separation of water from the mixture of acrylonitrile, acetone and water at least to the extent that the resultant mixture contains a weight ratio of acetone to water of one, then removing substantially the remainder of the water and acetone from the resultant mixture as the overhead by fractional distillation in an efficient fractionation column and recovering as the bottoms product the purified acrylonitrile containing less than 300 parts per million of acetone.

References Cited in the file of this patent
UNITED STATES PATENTS

| | | |
|---|---|---|
| 2,388,507 | Teter et al. | Nov. 6, 1945 |
| 2,404,163 | Carpenter | July 16, 1946 |
| 2,608,576 | Pietrusza | Aug. 26, 1952 |
| 2,681,306 | Kemp et al. | June 15, 1954 |
| 3,051,630 | Hadley et al. | Aug. 28, 1962 |
| 3,073,753 | Hadley et al. | Jan. 15, 1963 |